UNITED STATES PATENT OFFICE.

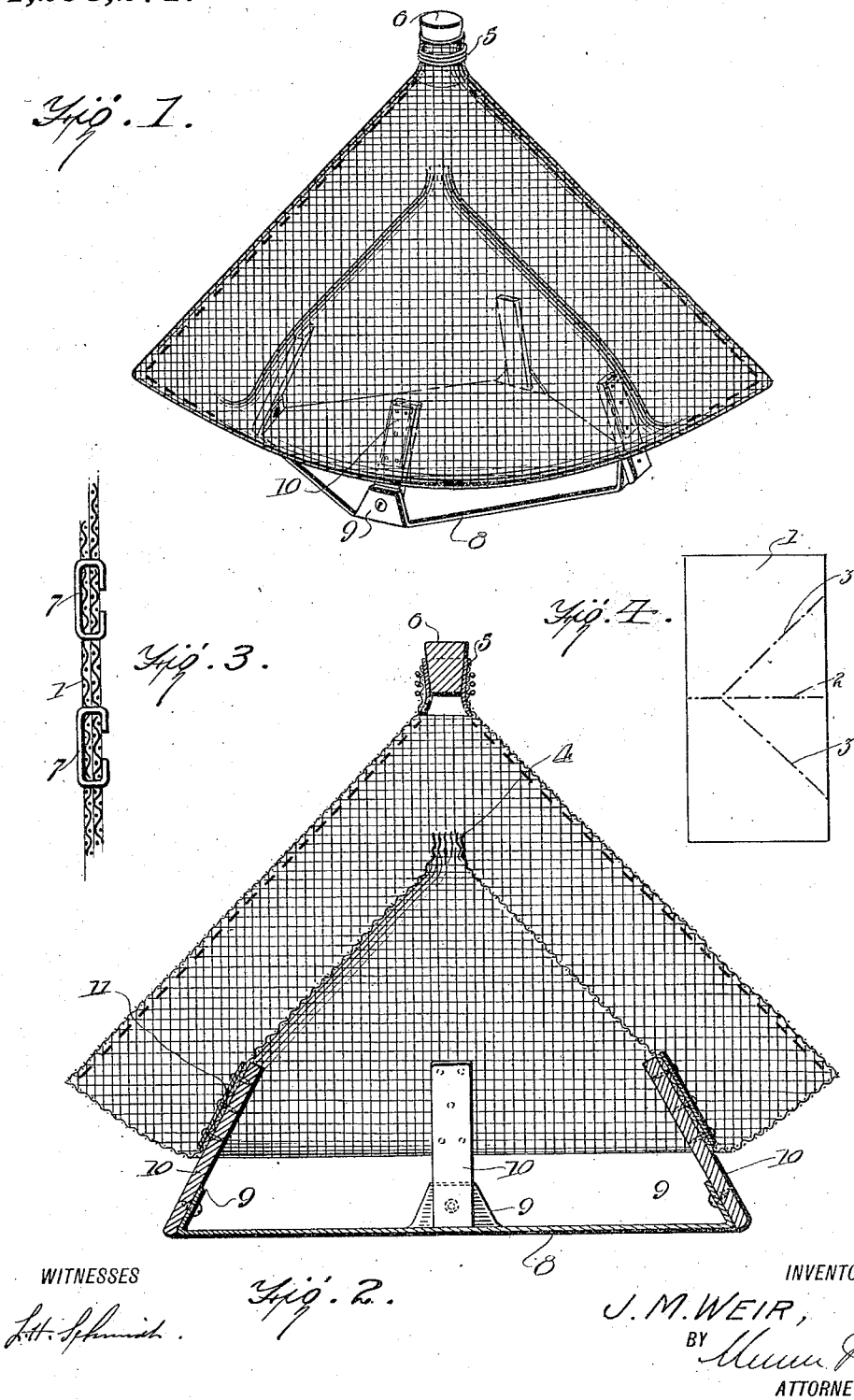

JAMES MILTON WEIR, OF GULFPORT, MISSISSIPPI.

FLY-TRAP.

1,293,271. Specification of Letters Patent. Patented Feb. 4, 1919.

Application filed November 6, 1918. Serial No. 261,365.

*To all whom it may concern:*

Be it known that I, JAMES MILTON WEIR, a citizen of the United States, and a resident of Gulfport, in the county of Harrison and State of Mississippi, have invented certain new and useful Improvements in Fly-Traps, of which the following is a specification.

My invention is an improvement in fly traps, and has for its object to provide a trap of the character specified wherein the trap consisting of inner and outer panels, is formed from a single sheet of perforate material, namely, the common wire fly screen cloth of commerce, bent upon itself.

In the drawings, (Note—the artist has inadvertently misrepresented the arrangement of the material. In the actual trap the strands of wire cloth run obliquely to the diameter of the trap, and approximately parallel to its sides,)

Figure 1 is a perspective view of the improved trap,

Fig. 2 is a vertical section,

Fig. 3 is an enlarged detail section showing the connection between the edges of the sheet, Fig. 4 is a plan view of the blank in which the trap body is formed.

*Prefatory explanation.*—This fly trap may be considered to have for its basic structure a simple square flat bag, of perforate material, namely, the common wire fly screen cloth of commerce, modified in a peculiar manner, as per following explanation:

A square, supported perpendicularly on one of its angles, and divided horizontally, at a point below its center, becomes a pentagon, above, and a triangle, below, the common dividing line.

A square, treated as above, with the triangle reversed, becomes a triangle within a pentagon.

A square, flat bag, of perforate material, namely, the common wire fly screen cloth of commerce, having its contour altered as described above, and distended, becomes owing to the elastic nature of the material, substantially conical in each of its members, having the cone which was the triangle within and concentric with the cone which has been formed from the pentagon, with their bases common and integral. This may readily be seen and understood by examination of the drawings.

*Practical explanation.*—In the present embodiment of the invention, the trap body consisting of the two substantially conical members arranged in spaced relation one within the other, is formed from a single sheet of perforate material, namely, the common wire fly screen cloth of commerce, of suitable size.

This sheet 1, as shown in Fig. 4, which is approximately twice the length of its width is crossed transversely intermediate its ends and at its center as indicated at 2. Cross lines 3 are provided at each side of the line 2, the lines 3 diverging from each other and inclining to line 2 at the same angle. This body is shaped to form two substantially conical members integrally connected at their large ends. In order to provide the body, the portion between the lines 3 is bent laterally with respect to the remainder of the strip 1, and the edges of the strip 1 between the cross line 2 and the remote ends of the cross lines 3 are brought together and secured together in any suitable manner. Afterward, the superposed edges of the side of the strip remote from the outer ends of the cross lines 3 are secured together. The ends then of the strip are connected as is also those portions of the edge of the strip 1 adjacent to the outer ends of the cross line 3. Thus two substantially conical members are formed, arranged one within the other, and integrally connected at the large end, and at its apex the inner member has an opening 4 of suitable size to allow the passage of flies upward into the space between the members. The outer member has a discharge opening 5 at its apex, which is reënforced with a collar or nipple, and which may be closed by a stopper 6. The abutting edges of the sheet are secured together by the clips 7 shown more particularly in Fig. 3. These clips are of wire which is bent in the manner of a paper fastener and firmly clamps one sheet against the other. These clips, or stitches, are preferably applied by a wire stitcher such as is used in the binding of magazines and pamphlets. This trap-body, owing to its peculiar construction, may be collapsed or distended at will, and has sufficient stiffness to dispense with any frame-work.

A suitable base is provided, for supporting the trap and also for supporting bait or a bait container. This support is in the form of a plate 8 of substantially rectangular shape, having in each corner a turned up lug 9. A leg 10 of wood or the like, is secured to each lug 9, by means of a screw as shown, but the legs to the right and left hand are secured to the inner surfaces of their respective lugs, while those front and back, represented in the center of the drawing, are secured to the outer surfaces of their respective lugs, this feature giving the necessary rigidity to the erected trap. These wooden legs are connected at their upper ends to the inner member of the trap body. The legs are passed upwardly inside the inner member, and plates 11 of sheet metal are lapped upon the outer face of the material, and plates are secured to the legs in any suitable manner, the securing means passing through the perforate material. By removing the screws from the lower extremities of the legs, the entire trap collapsed into a flat, thin package, suitable for packing and shipping. In use, the trap body is thus supported above the base, and a suitable bait for luring the flies to the trap may be placed upon the plate 8. After the flies have eaten, it being their instinct to go upward and toward the light, they will naturally rise, passing through the opening 4 into the space between the conical member which is closed, and has no outlet except through the nipple 5. This nipple is normally closed by the plug 6, which may be removed to empty the trap when desired.

I claim:

1. A trap of the character specified formed from a sheet of flexible perforate material folded on a line transverse to the center to form two folds, one lying upon the other, a substantially triangular portion of the material at one side of the sheet being folded inwardly between the two folds, the edges of the two folds and the edges of the infolded portion being secured together to permit the sheet to be expanded to form inner and outer conical members, and a base for supporting the trap detachable therefrom.

2. A trap of the character specified formed from a sheet of flexible perforate material folded on a line transverse to the center to form two folds, one lying upon the other, a substantially triangular portion of the material at one side of the sheet being folded inwardly between the two folds, the edges of the two folds and the edges of the infolded portion being secured together to permit the sheet to be expanded to form inner and outer conical members, and a base detachably connected with the infolded portion.

3. A trap of the character specified formed from a sheet of flexible perforate material folded on a line transverse to the center to form two folds, one lying upon the other, a substantially triangular portion of the material at one side of the sheet being folded inwardly between the two folds, the edges of the two folds and the edges of the infolded portion being secured together to permit the sheet to be expanded to form inner and outer conical members, and means for holding the trap expanded.

4. A trap of the character specified formed from a sheet of flexible perforate material folded on a line transverse to the center to form two folds, one lying upon the other, a substantially triangular portion of the material at one side of the sheet being folded inwardly between the two folds, the edges of the two folds and the edges of the infolded portion being secured together to permit the sheet to be expanded to form inner and outer conical members.

JAMES MILTON WEIR.

Witnesses:
A. A. MATHIAS,
B. HAVARD.

Copies of this patent may be obtained for five cents each, by addressing the "Commissioner of Patents, Washington, D. C."